United States Patent [19]
Ristau

[11] Patent Number: 5,949,441
[45] Date of Patent: Sep. 7, 1999

[54] MULTIMEDIA TERMINAL WITH AN ENCODER FOR CONVERTING ANALOG VIDEO DATA TO COMPRESSED DIGITIZED VIDEO DATA

[75] Inventor: Gerhard R. Ristau, Burnaby, Canada

[73] Assignee: International Business Machines Corporation, Armonk, N.Y.

[21] Appl. No.: 08/904,819

[22] Filed: Aug. 1, 1997

[51] Int. Cl.$^6$ .................................................. G09G 5/36
[52] U.S. Cl. ........................ 345/509; 345/202; 348/715
[58] Field of Search ..................... 345/302, 327, 345/328, 507, 509, 515, 516, 508, 202, 203; 348/500, 510, 512, 513, 516, 521–523, 552–554, 642, 708, 714–716, 718–720, 725–728; 395/551, 555, 556, 559

[56] References Cited

U.S. PATENT DOCUMENTS

| | | | |
|---|---|---|---|
| 5,426,731 | 6/1995 | Masukane et al. | 345/501 |
| 5,581,310 | 12/1996 | Vinekar et al. | 348/718 |
| 5,596,376 | 1/1997 | Howe | 348/718 |
| 5,680,151 | 10/1997 | Grimm et al. | 345/419 |
| 5,790,110 | 8/1998 | Baker et al. | 345/202 |
| 5,790,842 | 8/1998 | Charles et al. | 395/559 |
| 5,805,173 | 9/1998 | Glennon et al. | 345/501 |
| 5,847,771 | 12/1998 | Cloutier et al. | 348/564 |
| 5,872,784 | 2/1999 | Rostoker et al. | 370/395 |

*Primary Examiner*—U. Chauhan
*Attorney, Agent, or Firm*—A. P. Tennent

[57] ABSTRACT

A multimedia terminal for adapting audio-video signals into a digital data network is provided. The terminal comprises a video decoder, a video encoder, a frame buffer, and a host processor coupled to the frame buffer. The frame buffer has a plurality of memory fields, a system time clock that is switchable from a free running clock to being locked to the analog video signals and a frame buffer logic control circuit which controls the flow of data in and out of the memory fields. The frame buffer is able to operate in two distinct modes.

24 Claims, 2 Drawing Sheets

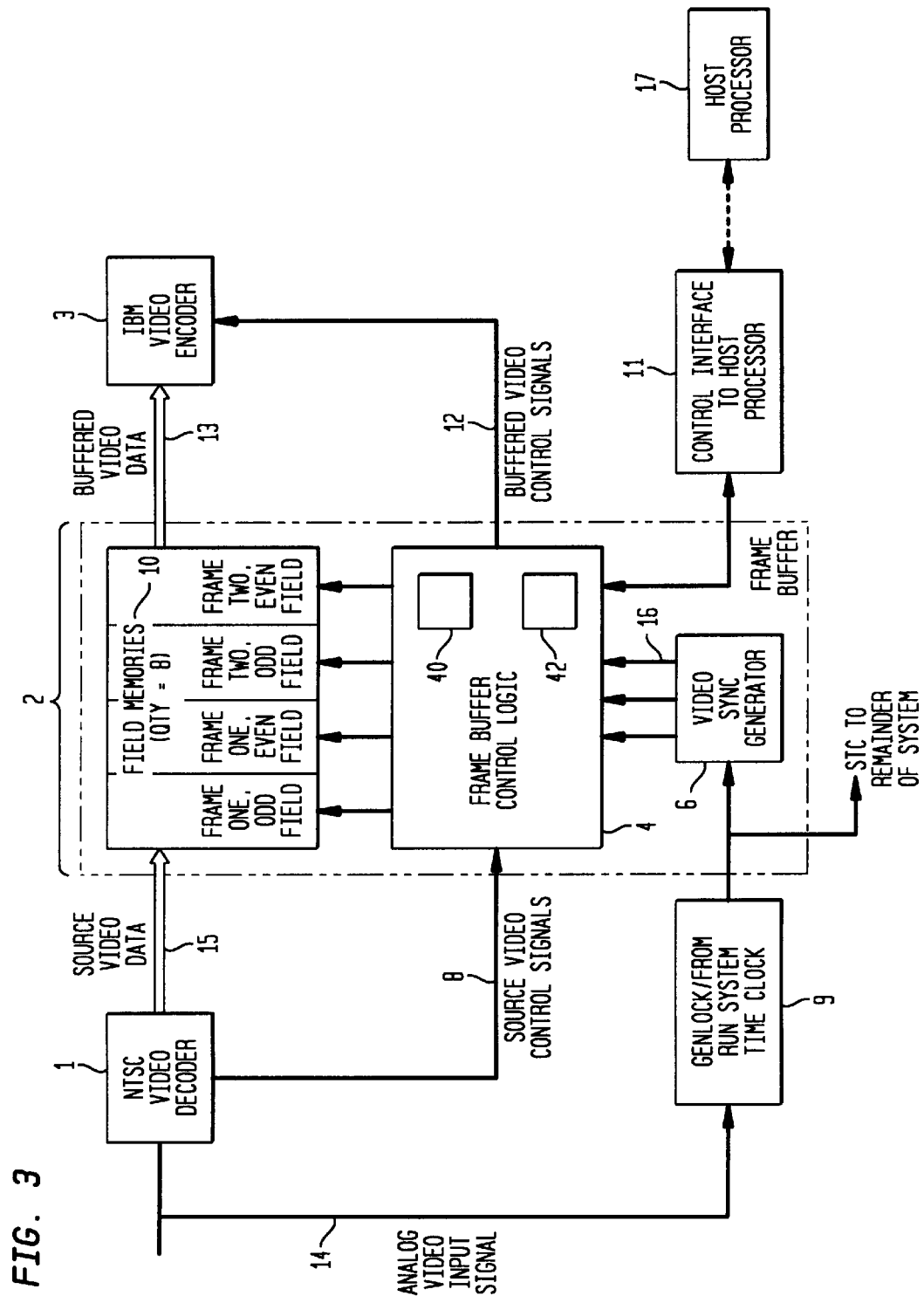

MULTIMEDIA TERMINAL WITH AN ENCODER FOR CONVERTING ANALOG VIDEO DATA TO COMPRESSED DIGITIZED VIDEO DATA

CROSS REFERENCES TO RELATED PATENTS

The following patents are related to the present invention and incorporated herein by reference:
1. MULTIPLEXER FOR MULTIPLE MEDIA STREAMS, (IBM Attorney Docket CA997025A), Ser. No. 08/904,813, filed concurrently;
2. METHOD AND APPARATUS FOR CONTROLLING ELEMENTARY STREAM DATA FLOW, (IBM Attorney Docket CA997026), Ser. No. 08/904,819 filed concurrently;
3. ISOLATION OF MULTIMEDIA SIGNALS FOR TRANSMISSION AND PROCESSING WITHIN A MULTIMEDIA TERMINAL, (IBM Attorney Docket CA997027), Ser. No. 08/904,778, filed concurrently;
4. INTERNET APPLICATION ACCESS SERVER APPARATUS AND METHOD, (IBM Attorney Docket CA997031), Ser. No. 08/905,197, filed concurrently;
5. NETWORK COMMUNICATION SERVICES METHOD AND APPARATUS, (IBM Attorney Docket CA997034), Ser. No. 08/904,493, filed concurrently;
6. METHOD AND APPARATUS FOR MAINTAINING DIRECTORY SERVICES FOR A VIDEO TRANSMISSION NETWORK, (IBM Attorney Docket CA997035), Ser. No. 08/904,774, filed concurrently;
7. METHOD AND APPARATUS FOR CONTROLLING ACCESS IN A VIDEO DISTRIBUTION NETWORK, (IBM Attorney Docket CA997036), Ser. No. 08/904,775, filed concurrently;
8. METHOD AND APPARATUS FOR CONTROLLING NETWORK SWITCHES, (IBM Attorney Docket CA997037), Serial Number (to be assigned), filed concurrently; and
9. METHOD AND APPARATUS FOR CONTROLLING A MIXED NETWORK OF ANALOG AND DIGITAL SWITCHES, (IBM Attorney Docket CA997038), Ser. No. 08/904,872, filed concurrently.

FIELD OF THE INVENTION

This invention relates to multimedia processing systems. In particular, this invention relates to frame buffers for buffering multimedia data in these processing systems.

BACKGROUND OF THE INVENTION

Multimedia terminals for processing two or more multimedia signals and either storing them or sending them over communications lines to other terminals are presently evolving. Such terminals require not only circuits to receive and transmit analog video signals and audio signals but they also require circuits which digitize and compress the data and package it for transmission so that it may be received at a receiving station, decoded and the original analog signals regenerated. Because of the speed required to transmit the high volume of data involved, efficient means of packaging the data for transport is essential. Adding to the difficulties is the fact that source signals may be stable or unstable. For certain applications such as video teleconferencing a minimum delay is important whereas for other applications where the source signal is not stable, it may be possible to sacrifice latency and accept loss of signal in order to achieve a continuous signal.

A sending end clock sends out analog data at a sending clock rate. This data is received after transmission by a multimedia terminal and digitized. The digitization is accomplished by regular sampling of the analog signal and generation of a digital word to represent each sampled signal. In addition, control information is extracted from the headers of the analog signal after digitization. If one extracts the clock of the incoming analog signal, then a minimum delay is required to package the data and ready it for transport. However, should the signal be unstable then an undesirable affect on the received signal results. Often it is possible to sacrifice delay or latency for signal quality. In other cases it is important to minimize delay.

Accordingly, it is an object of the present invention to provide an improved multimedia terminal which can accommodate a requirement for minimum delay and also accommodate unstable signals where delay is not of crucial importance.

One of the main requirements of an encoder, in particular the Motion Pictures Experts Group-2 (MPEG-2) encoder, is that the digital data received by the encoder must be synchronized to the system time clock since the system time clock (STC) signal is used for timing in the encoder. The system time clock signal is periodically sampled and as part of the multiplexing (mux) operations is placed on a transport data stream. Previous means of synchronizing the STC signal with the sending clock rate of the analog signal involved locking the system clock to the analog signal and using a phased lock loop to generate a specific rate.

The disadvantage with this type of synchronization is that an interruption of the input signal or an unstable data signal results in jitter. Thus, there is a need for an alternative method that synchronizes the video data with STC without being subject to disruption of the analog signal.

In addition, under MPEG-2, there is a requirement that the encoder receive only whole video frames. Consequently, there is a need for a mechanism which ensures that the encoder receives only whole frames of data.

Accordingly, it is an object of this invention to provide an improved frame buffer which can operate in two modes. One of the modes synchronizes the asynchronous field rate with the STC while the second mode passes data through with minimal delay.

SUMMARY OF THE INVENTION

According to the invention, there is provided a multimedia terminal for adapting multimedia signals into a digital data network comprising a video decoder to digitize analog signals, extract timing information, and convert data, a video encoder for compressing data, a frame buffer capable of two modes of operation, and a host processor through which a user may be able to choose the mode of operation of the frame buffer.

The frame buffer which interfaces between the video decoder and a video encoder comprises of a plurality of memory fields, a system time clock which is able to be switched from a free running mode to being locked to an analog video signal in response to the host processor, and a frame buffer logic control circuit which is coupled to the memory fields, the decoder, and the encoder and which controls the flow of data into and out of the memory fields. The frame buffer is able to operate in two modes, namely, a system locked clock mode where the system time clock is locked to the analog signal and a frame buffer mode where the system time clock runs freely.

Preferably, the number of memory fields in the frame buffer is four.

In the source locked clock mode, only one memory field is used. A line of data is written into the memory field and before the writing pointer has finished writing this line, a reading pointer begins reading it. A second line of data is written over the first line. In this mode, the system time clock is locked to the analog video signal.

In the frame buffer mode, all four memory fields are used to store frames of video data. Each frame is divided into two packets of data, one packet containing data from the scan lines of the odd field of the frame and a second packet containing data from the scan lines of the even field of the frame. Because each frame is stored in two memory fields in the buffer, the frame buffer can store two frames at a time. The frame buffer further includes a video sync generator which decouples the system time clock from the analog signal rate.

A method of buffering frames of digital video signals in each of the two modes is provided. In the frame buffer mode, the data is written with a writing pointer into the four memory fields in a sequential manner and data is read with a reading pointer from the memory fields. In the source locked clock mode, a line of data is written and this line is read out before it is overwritten by another line of data.

BRIEF DESCRIPTION OF THE DRAWINGS

The novel features believed to characterize the invention are set forth in the appended claims. The invention, itself, however, as well as other features and advantages thereof, will be best understood by reference to the detailed description which follows, read in conjunction with the accompanying drawings, wherein:

FIG. 3 is a block diagram of the encoder showing the components of the frame buffer;

DETAILED DESCRIPTION OF THE INVENTION

Figure 1:
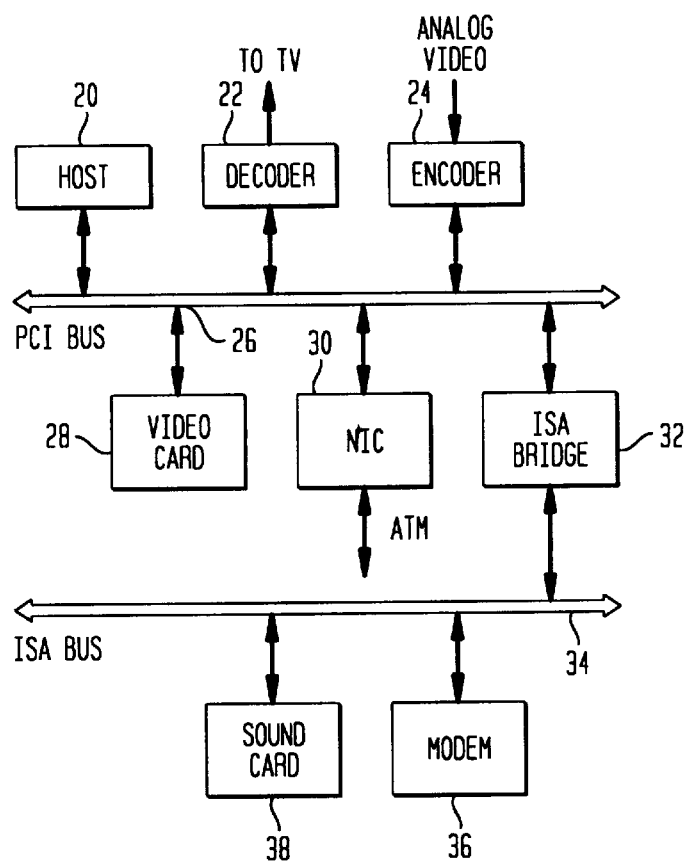
FIG. 1 is a block diagram of the components of a multimedia terminal.

Referring to FIG. 1, a multimedia terminal may consist of a host processor 20 coupled to a high bandwidth PCI Bus 26. Also coupled to the PCI Bus 26 is a video decoder 22, a video encoder 24, a network interface card (NIC) 30, a video card 28 and an audio system coupled to the PCI Bus 26 by an ISA Bridge 32. The audio system includes a sound card 38 and a modem 36. In this case, data management is controlled by the host processor 20. An analog video signal is received by the encoder 24 digitized and compressed and placed on the PCI Bus 26. In the case the signal is to be used locally, the decoder 22 decompresses the signal from the PCI Bus 26 and transmits it to a TV. Alternatively, if the compressed signal is to be retransmitted over an ATM line it is converted by an NIC 30 and placed on an ATM line and directed to an ATM physical layer device (not shown). The audio received from a modem 36 or a sound card 38, in digital form, is placed on an ISA Bus 34 and transmitted across ISA Bridge 32 to a PCI Bus 26 where it may be sent via NIC 30 on an ATM line. Audio may also be received together with the analog video signal by encoder 24 and placed in a transport stream onto the PCI Bus 26.

Figure 2:
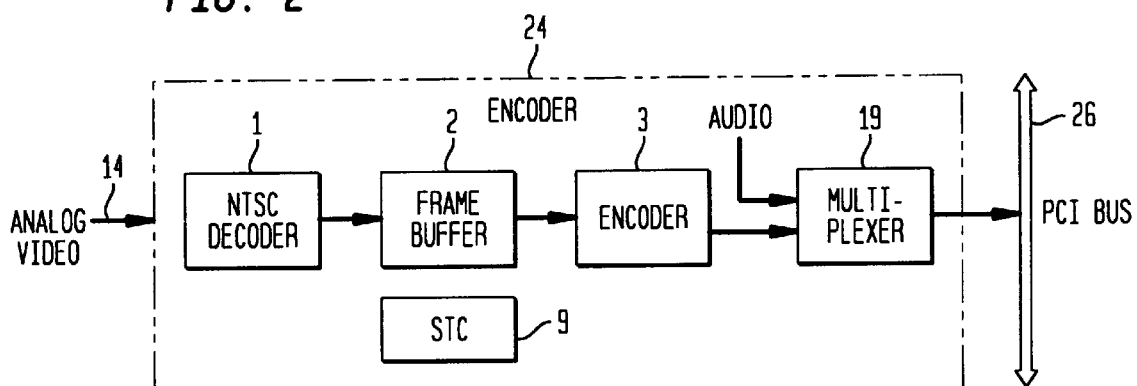
FIG. 2 is a block diagram of an encoder.
Figure 4:
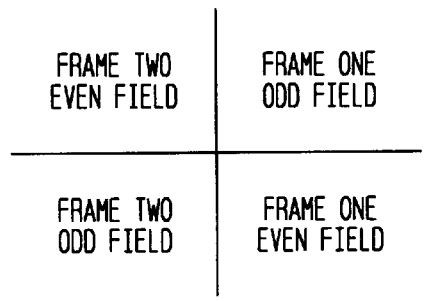
FIG. 4 is block diagram of a frame buffer field memories.

Referring to FIG. 2, the encoder 24 includes an NTSC Decoder 1 which receives analog video data, digitizes it and sends the digital stream to a frame buffer 2. The frame buffer 2 decouples the data from the clock at the sender's end from which the analog video signal was sent and couples it to a system time clock 9. The data from the frame buffer 2 is sent to an encoder 3 which compresses the data after which it is interleaved with digitized audio by a multiplexer 19 and placed on the PCI Bus 26.

The analog video input signal 14, thus, is sampled by the decoder 1 converting analog signals to digital data. The decoder 1, also, extracts the timing information and the source video control signals 8 from the header. The decoder 1 further interprets the analog video input signals 14 so that scan lines of the odd field of a video frame is read first followed by scan lines of the even field of the frame resulting in a packet of digital data from an odd field and a packet of digital data from an even field for each frame.

Referring to FIG. 3, a frame buffer 2 is made of field memories 10, programmable frame buffer control logic 4, and a video sync generator 6. The memory fields 10 can hold up to four fields of data which are designated in order, frame one-odd, frame one-even, frame two-odd and frame two-even. Each frame has 240 lines with 720 pixels per line. Each pixel is made up of 16 bits of which 8 bits which describe the luminance or intensity and 8 bits describe the chrominance or color. Thus, each memory field 10 must store 16×240×720=2,764,800 bits. Each frame of video is stored in two fields. A packet of digital data of scan lines from an odd field are stored in one memory field 10 and a packet of digital data of scan lines from an even field are stored in another memory field 10. Because of hardware considerations the memory is made up of two separate memory chips. Eight bits of each pixel or word describing luminance are stored on one of the chips and eight bits describing chrominance are stored on the other chip. Obviously, a single chip with memory equal to that of the two chips could be used.

The frame buffer 2 is able to operate in two modes, namely, a frame buffer mode and a source locked clock mode. In the frame buffer mode, the analog video input signal 14 is synchronized against a STC 9 that is allowed to run freely within its 27 MHZ rate with 30 ppm tolerance. In the source locked clock mode, the STC 9 is synchronized by locking onto the analog video input signal 14 using a phased lock loop circuit which generates a 27 MHz rate. The operating mode of the frame buffer 2 is chosen by the user through the host processor 17. The control interface 11 to the host processor links the host processor to the frame buffer control logic 4. The interface 11 controls registers in the frame buffer control logic 4 which activate different portions of the frame buffer control logic 4 and thus can determine which mode will be in use.

Frame buffered mode

In the frame buffered mode, the frame buffer 2 is able to provide a complete frame of data to the encoder 3 even if there is an interruption in the analog video input signal 14. Referring to FIG. 3, the frame buffer control logic 4 is designed so that video data is written and read sequentially in the four memory fields 10: Frame 1, odd field; Frame 1, even field; Frame 2, odd field; Frame 2, even field.

As long as there is a valid input signal, writing of the data occurs sequentially into the different memory fields 10 shown in FIG. 3. The source video control signals 8 (video synchronization signals) from the decoder 1 advance the frame buffer 2 through the various states and the source video data 15 from the video decoder 1 is written onto the fields. Source video control signals 8 include signals such as NEW FIELD, FIELD TYPE, NEW LINE.

The field memories 10 of the frame buffer 2 have a pointer which determines whether data is going to be written in a particular memory field 10. For example, one field of data is written into the memory field "Frame One, Odd field". If valid source video data 15 is present at the end of this field, the pointer is advanced to the next memory field "Frame One, Even Field". If valid source video data 15 is not present, the pointer remains in the memory field "Frame One, Odd Field" and the incomplete data in the memory field is overwritten and so on. After the four memory fields 10 of the frame buffer 2 have been written on, the oldest data is overwritten. Table 1 shows the logic used to write into the memory fields 10 of the frame buffer 2.

TABLE 1

Write to field memory state machine in frame buffer mode

```
if (OPERATING MODE)=FRAME BUFFER
{
  wait until (SOURCE VIDEC CONTROL SIGNALS)=new field
}
if (NEW FIELD TYPE)=ODD
  {
    if (LAST WRITE FRAME)=TWO
    {
      CURRENT WRITE FRAME=ONE
      CURRENT WRITE FIELD=ODD
    }
    else if (LAST WRITE FRAME)=ONE
    {
      CURRENT WRITE FRAME=TWO
      CURRENT WRITE FIELD=ODD
    }
  }
if (NEW FIELD TYPE)=EVEN
  {
    if (LASTWRITE FRAME)=TWO
    {
      CURRENT WRITE FRAME=ONE
      CURRENT WRITE FIELD=EVEN
}
    else if (LAST WRITE FRAME)=ONE
    {
      CURRENT WRITE FRAME=TWO
      CURRENT WRITE FIELD=EVEN
    }
  }
}
wait until (VIDEO DATA VALID)=TRUE
{
if (CURRENT WRITE FIELD)=ODD and (CURRENT WRITE
    FRAME)=ONE
  {
  Write video data to field memory devices 1&2
  }
else if (CURRENT WRITE FIELD)=EVEN and (CURRENT WRITE
    FRAME)=ONE
  {
  Write video data to field memory devices 3&4
  }
else if (CURRENT WRITE FIELD)=ODD and (CURRENT WRITE
    FRAME)=TWO
  {
  Write video data to field memory devices 5&6
  }
else if (CURRENT WRITE FIELD)=EVEN and (CURRENT WRITE
    FRAME)=TWO
  {
  Write video data to field memory devices 3&4
  }
    continues to end of video field
}
```

The frame buffer 2 is read as a result of signals from the frame buffer control logic 4 and the video sync generator 6. The video sync generator 6 is a set of counters which creates a set of video sync generator signals 16 that have timing relationships with source video control signals 8 but uses the STC 9 as a reference for the timing. As a result, the reading rate is determined by the STC 9. It should be noted that the STC rate is not synchronous to the rate of the source video data 15.

Like writing, reading occurs sequentially. Before the read pointer 40 is advanced to a memory field 10, the position of the write pointer is determined. If the read pointer is about to enter the same memory field 10 as the write pointer, the read pointer is set back one whole frame and that frame is reread and, thus, repeated. For example, if the read pointer is about to move into "Frame Two, Odd Field" and a write pointer 42 is already positioned in this memory field, the read pointer is moved to "Frame One, Odd field".

If the write pointer enters a memory field 10 with a read pointer, the read pointer is moved forward a whole frame skipping a frame. For example, if the read pointer is about to move into "Frame Two, Odd Field" from "Frame One, Even Field" and the machine detects that the write pointer is positioned in "Frame One, Even Field", the read pointer is moved to "Frame One, Odd Field".

It is the reading pointer that is controlled by the STC 9 through the video sync generator 6, and is manipulated to synchronize the input data. Table 2 shows the logic used to read the memory fields 10 of the frame buffer 2.

TABLE 2

Read to field memory state machine in frame buffer mode

```
if (OPERATING MODE)=FRAME BUFFER
{
wait until (VIDEO SYNC GENERATOR CONTROL)=new field
{
if (NEW FIELD TYPE)=ODD & (LAST READ FRAME)=TWO
  {
  IF (CURRENT WRITE FRAME)=ONE & (CURRENT WRITE
      FIELD)=ODD
    OR
  (CURRENT WRITE FRAME)=TWO & (CURRENT WRITE
      FIELD)=EVEN
    {
    CURRENT READ FRAME=TWO
    CURRENT READ FIELD=ODD
    }
  else
    {
    CURRENT READ FRAME=ONE
    CURRENT READ FIELD=ODD
    }
  }
else if (NEW FIELD TYPE)=EVEN & (LAST READ FRAME)=ONE
  {
  IF (CURRENT WRITE FRAME)=ONE & (CURRENT WRITE
      FIELD)=EVEN
    OR
  (CURRENT WRITE FRAME)=ONE & (CURRENT WRITE
      FIELD)=ODD
    {
    CURRENT READ FRAME=TWO
    CURRENT READ FIELD=EVEN
    }
  else
    {
    CURRENT READ FRAME=ONE
    CURRENT READ FIELD=EVEN
    }
  }
else if (NEW FIELD TYPE)=ODD & (LAST READ
    FRAME)=ONE
  {
  IF CURRENT WRITE FRAME)=TWO & (CURRENT WRITE
      FIELD)=ODD
    OR
  (CURRENT WRITE FRAME)=ONE & (CURRENT WRITE
      FIELD)=EVEN
    {
    CURRENT READ FRAME=ONE
    CURRENT READ FIELD=ODD
    }
  else
    {
```

TABLE 2-continued

Read to field memory state machine in frame buffer mode

```
    CURRENT READ FRAME=TWO
    CURRENT READ FIELD=ODD
    }
  }
else if (NEW FIELD TYPE)=EVEN & (LAST READ FRAME)=TWO
  {
  IF (CURRENT WRITE FRAME)=ONE & (CURRENT WRITE
      FIELD)=EVEN
  OR
  (CURRENT WRITE FRAME)=ONE & (CURRENT WRITE
      FIELD)=ODD
    {
    CURRENT READ FRAME=TWO
    CURRENT READ FIELD=EVEN
    }
  else
    {
    CURRENT READ FRAME=ONE
    CURRENT READ FIELD=EVEN
    }
  }
else if (LAST WRITE POINTER)=ONE
  {
  CURRENT READ FRAME=TWO
  CURRENT READ FIELD=ODD
  }
}
if (FIELD TYPE)=EVEN
  {
  if (LAST FRAME POINTER)=TWO
    {
    CURRENT READ FRAME=ONE
      CURRENT READ FIELD=EVEN
    }
  else if (LAST WRITE POINTER)=ONE
    {
    CURRENT READ FRAME=TWO
    CURRENT READ FIELD=EVEN
    }
  }
}
```

Source Lock Clock Mode

In the source lock clock mode, the system time clock is synchronized to the analog video input signal 14. The signal is locked by a phase locked loop against the analog video input signal 14 provided that the analog video input signal field rate remains within the predetermined limits. The frame buffer 2 does not provide synchronization.

When in this mode, only one memory field 10 is used instead of all four as in the frame buffered mode. All memory fields 10 are disabled in this mode except the "Frame One, Odd Field". In the source lock clock mode, only one line of video information is stored at a time. The frame buffer 2 waits until 500 pixels of the line have been written and then begins reading the entire line of data (720 pixels). When a new valid line is received, this one line of video is overwritten. Writing and reading in the source locked clock mode is controlled by source video control signals 8. The logic involved in writing in this mode is presented in Table 3.

TABLE 3

Write to field memory state machine in source locked mode

```
if (OPERATING MODE)=SOURCE LOCKED CLOCK
  {
  wait until (SOURCE VIDEO CONTROL SIGNALS)=SOURCE
      LOCKED CLOCK
    {
    begin to write one line of data into field memories
      {
      for each valid pixel received, SOURCE LOCKED CLOCK
          PIXEL COUNT is incremented
        {
        if (SOURCE LOCKED CLOCK PIXEL C6UNT)>500,
        SOURCE LOCKED CLOCK PIXEL READY=SET
        }
      write remaining pixels of the line into field
          memories
      }
  }
```

The logic involved in reading in this mode is presented in Table 4.

TABLE 4

Read to field memory state machine in source locked mode

```
if (OPERATING MODE)=SOURCE LOCKED CLOCK
  {
  wait until (SOURCE LOCKED CLOCK PIXEL READY)=SET
    {
    read one line of data from the field memories
    set (SOURCE LOCKED CLOCK PIXEL READ)=CLEAR
    }
  }
```

Pixel on/off

In a preferred embodiment, pixel flow can be switched on and off at video frame boundaries to ensure that only complete video frames are received and the video data is not interrupted. The video sync generator signals 16 control the pixel flow in the frame buffer mode and the source video control signals 8 control the pixel flow in the Source Locked Clock Mode. The buffered video control signals 12 of the frame buffer 2 are gated. The gate can only change state when buffered video data 13 is not being supplied to the video encoder 3. The frame buffer 2 switches pixels on or off at only frame boundaries resulting in a start or stop. When a command is received to turn the pixels off, the frame buffer 2 stores the command until the end of a frame boundary is reached before it executes the command. When a command is received to turn on the pixels, the frame buffer 2 will store the command until the beginning of the next frame boundary before it executes the command.

The logic involved in this operation is shown in Table 5:

TABLE 5

Pixel on and off

```
if (OPERATING MODE)=FRAME BUFFER MODE
  {
  if (HOST PIXEL CONTROL)=(NEW STATE)
    {
    if (VIDEO SYNC GENERATOR)=NEW FRAME
      {
      set (PIXEL GATING)=NEW STATE
      else
    }
  }
else (OPERATING MODE)=SOURCE LOCKED CLOCK MODE
  {
  if (HOST PIXEL CONTROL)=NEW STATE
    {
    IF (VIDEO SOURCE CONTROL SIGNALS)=NEW FRAME
      {
      set (PIXEL GATING)=NEW STATE
```

TABLE 5-continued

Pixel on and off

```
        else
        }
    }
}
```

While the present invention has been described with particularity, it should be understood that various modifications and alterations may be made therein without departing from the spirit and scope of the invention set forth in the appended claims.

The embodiments of the invention in which an exclusive property or privilege is claimed are defined as follows:

1. A multimedia terminal for adapting analog audio-video signals into compressed digital data for transmission on a digital data network comprising:
    a) a video decoder for digitizing analog video signals, extracting timing signals, and converting data to digital data;
    b) a video encoder for compressing the digital data for transmission on the digital data network providing the compressed digital data onto a system bus;
    c) a frame buffer for interfacing between a video decoder and an encoder, said frame buffer capable of two modes of operation, one mode of operation allowing data to be sent from the decoder to the encoder line by line, the other mode of operation allowing data to be sent frame by frame from the decoder to the encoder;
    d) a host processor coupled to said frame buffer and responsive to a user selection signal to determine the mode of operation for the frame buffer; and
    e) a coupler the system bus to the digital data network to transmit the compressed digital data on the system bus to the digital data network.

2. A frame buffer for use in a multimedia terminal having a host processor to interface between a video decoder which encodes analog video signals as digital video data and extracts from the video signals the sending clock and a video encoder which is operative to compress the digital video data, said frame buffer comprising:
    (a) a plurality of memory fields;
    (b) a system time clock for providing clock signals to the video encoder, said clock being switchable from a free running clock to being locked to the analog video signals in response to control signals from said host processor; and
    (c) a frame buffer logic control circuit coupled to said memory fields, to said decoder, said encorder and to said system time clock, operative to control the flow of data into and out of said plurality of memory fields in two modes, a frame buffer mode where data is transferred in frames to the video encoder and a source locked clock mode where data is transferred line by line, said frame buffer operates in said frame buffer mode when said system time clock is free running and in said locked clock mode when said system time clock is locked to said analog video signal.

3. A frame buffer according to claim 2, wherein the number of memory fields is four.

4. A frame buffer according to claim 3, wherein only one memory field is utilized to store data when in the source locked clock mode.

5. A frame buffer according to claim 4, wherein said memory field stores only one line of data before it is rewritten.

6. A frame buffer according to claim 4, wherein said line of data is at least half written when the line of data is started to be read.

7. A frame buffer according to claim 3, wherein the four memory fields are comprised to two even memory fields and two odd memory fields,
    wherein, each frame of digital data is separated into a first packet including all scan lines from an odd field of said frame and a second packet including all scan lines from an even field of said frame with the first packet stored in the odd field and second packet in the even field.

8. A frame buffer according to claim 2, further including a video sync generator, said video sync generator providing control signals to the frame buffer logic control circuit for reading the memory fields and said frame buffer logic control circuit having gathering circuitry for gating pixel flow on and off at frame boundaries to assure only complete frames are provided to the video encoder.

9. A method of buffering frames of digital video signals in each of two modes, comprising:
    in a first mode:
        (a) writing digital video data with a writing pointer into a plurality of memory fields in accordance with the way in which analog video data have been generated at a sending end and at a rate determined by a sending clock;
        (b) reading out data stored in said memory fields after a complete frame has been written in accordance with a system time clock; in a second mode
        (c) switching said system time clock from a position in which it is free running to one in which it is locked to the incoming analog video signal;
        (d) writing a first line of pixels of digital video data in a memory field;
        (e) reading out each pixel subsequent to its being written at a rate determined by said system time clock; and
        (f) overwriting the first line of pixels with a new line of pixels after the first line has been read out.

10. A method according to claim 9, including interleaving the analog video data such that each frame of video data is packetized into a packet of data from scan lines of an odd field of said frame and a packet of data from scan lines of an even field of said frame.

11. A method according to claim 10, wherein the frame buffer has four memory fields, one of said memory fields storing a packet of data from scan lines of the odd field of a frame and another a packet of data from scan lines of the even field of a frame and said frame buffer storing a total of two frames.

12. A method according to claim 11, wherein writing digital video data into a plurality of memory fields further comprises the steps of:
    a) writing one packet of data of an odd field of one frame in a first memory field;
    b) writing a second packet of data of an even field of said frame in a second memory field;
    c) writing a third packet of data of an odd field of a second frame in a third memory field;
    d) writing a fourth packet of data of an even field of a second frame in a fourth memory field;
    e) repeating steps (a) to (d) for a third and subsequent frames overwriting with data in said third and subsequent frames, said data incorporated into packets from odd and even fields or frames,
    wherein, source video control signals determine whether a new packet of data is to be written on a memory field, whether the data is valid, and the type of data that is in the packet.

13. A method according to claim 12, wherein reading digital video data with a reading pointer from a plurality of memory fields further comprises the steps of:

a) determining whether a writing pointer is present in a memory field to be read;

b) reading the field if said reading pointer is absent from the memory field to be read;

c) skipping back to a previous frame if said reading pointer is present;

d) reading said previous frame again, wherein the reading pointer is controlled by a video sync generator in accordance with a system time clock.

14. A method according to claim 13, further including skipping forward a frame if a writing pointer enters the same memory field as a reading pointer.

15. A method according to claim 9, further including turning on or off the flow of pixels only at frame boundaries so that only complete video frames are sent to the video encoder.

16. A multimedia terminal for adapting analog video signals provided at a source clock rate to digital data running on a system clock rate for transmission on a digital data network comprising:

a) a host processor running at the system clock rate on a system bus;

b) a video digitizer for converting the analog video signals to digitally encoded data and providing source clock data extracted from the video signals;

c) a video encoder operating at the system clock rate for compressing the digital data for transmission on the digital data network;

d) a frame buffer interfacing the video converter and the encoder for providing the digital video data to the video encoder in two different modes of operation, a frame buffer mode where the digital video data is transferred from the frame buffer to the video encoder one frame at a time using a free running system time clock rate and a source locked clock mode where data is transferred from the frame buffer to the video encoder one line at a time using the system time clock rate locked to the source clock rate; and e) means coupling the system bus to the digital data network to transmit compressed digital video data on the system bus onto the digital data network.

17. The multimedia terminal of claim 16 wherein said frame buffer includes multiple memory fields for storing two frames of digital data, means for transferring, during the frame buffer mode of operation, compressed digital video data of one frame of digital data from one of the memory fields while writing digital data from another frame of digital data into another one of the memory fields and for transferring during the source locked clock mode one line at the time from only one of the memory fields overwriting the line with a next line of digital video data when the line of data has been read from the frame buffers.

18. The multimedia terminal of claim 17, wherein there are four memory fields comprised of two even memory fields and two odd memory fields, wherein, each frame of digital data is separated into a first packet including all scan lines from an odd field of said frame and a second frame including all scan lines from an even field of said frame and the first packet stored in the odd memory field and the second packet in the even memory field.

19. The multimedia terminal of claim 18, further including a video sync generator, said video sync generator providing control signals for reading the memory fields.

20. The multimedia terminal of claim 19 including a system clock providing free running system time clock signals to said video sync generator during the frame buffer mode and system time clock signals locked to the source clock rate during the source locked clock mode.

21. The multimedia terminal for claim 20 including frame buffer logic receiving source video signals from the video digitizer, control signals from the video such generation and mode selection signals from the host processor to control the four field memories during the transfer of data.

22. The multimedia terminal of claim 21 wherein said frame buffer control logic provides buffered video control signals to the encoder which control signals are gated to change state only when buffered video data is not being supplied to the video encoder and switches the transfer of pixels on or off only at frame boundaries whereby only complete video frames are transferred to the video encoder.

23. The multimedia terminal of claim 21 including read pointer and write pointer control means for enabling the sequential reading and writing of data, said control means preventing the read pointer from entering a field containing the write pointer by moving the read pointer back a frame to reread the frame and from moving the read pointer ahead a frame to skip a frame when write pointer enters a field with the read pointer.

24. The multimedia terminal of claim 23 including means for determining if a frame contains valid source data and for overwriting the data in the frame when the source data is not valid.

* * * * *